fig. 2

Aug. 30, 1966 J. D. MORLEY ETAL 3,270,180
METHOD AND APPARATUS FOR STRIP WELDING
Filed Nov. 13, 1963 10 Sheets-Sheet 3

INVENTOR.
JOHN D. MORLEY
BY JOHN F. NYSTROM
WILLIAM L. WARD

Woodhams, Blanchard & Flynn
ATTORNEYS fig. 4 fig. 9 fig. 5a fig. 6 fig. 7 fig. 8

INVENTORS
JOHN D. MORLEY
JOHN F. NYSTROM
BY WILLIAM L. WARD
Woodhams Blanchard & Flynn
ATTORNEYS fig. 15 fig. 16 fig. 17 fig. 18 fig. 19

United States Patent Office 3,270,180
Patented August 30, 1966

3,270,180
METHOD AND APPARATUS FOR STRIP WELDING
John D. Morley and John F. Nystrom, Bay City, and William L. Ward, Essexville, Mich., assignors to National Electric Welding Machines Company, Bay City, Mich., a corporation of Michigan
Filed Nov. 13, 1963, Ser. No. 323,534
16 Claims. (Cl. 219—81)

This invention relates to a method and apparatus for joining weldable strip material and it relates particularly to such apparatus adaptable for doing so with only a momentary interruption in the movement of strip otherwise travelling at a high rate of speed.

While the method and apparatus of the present invention will be applicable to a wide variety of situations where strip material is to be joined, such strip material including, for example, both metals and plastics, the particular application of the method herein utilized to illustrate the invention was developed for welding adjoining ends of strip steel and the description will accordingly proceed with specific reference thereto. It will be understood, however, that such specific reference to method and apparatus handling strip steel is for illustrative purposes only and is not limiting.

As set forth in more detail in the application of Heller and Morley, Serial No. 227,446, and assigned to the same assignee as the present application, the problem of joining the ends of strip steel is a common one in a wide variety of different instances. For example, in both the manufacture and use of elongated strip material, such as steel, there are many instances where such material is handled on a continuous basis even though it may be supplied from individual, successively presented rolls. Thus, in the manufacture of steel strip such operations as annealing, edge trimming, pickling, surface treating and others are carried out at very high rates of speed, which speed must in many cases be maintained at a uniform value. This material is normally supplied to the processing equipment in the form of successively presented rolls thereof and the trailing end of one strip is fastened to the leading end of the next strip by suitable means in order that a continuous strip may be supplied to the processing equipment.

The problem of keeping the strip material going through the processing equipment at a continuous and uniform rate of speed, and yet provide for momentary stopping of the end thereof in order to effect the necessary joining of such ends together, has been dealt with in many instances and in a variety of ways. Usually, there is provided a large loop in the material being fed so that the continuously running portion thereof can be supplied from said loop while the ends are momentarily stopped for joining. At high rates of speed, however, this loop must be excessively large unless the time during which the ends are stopped can be made very small. Many attempts have been made to reduce the period of time during which such ends are stopped for joining and it is the purpose of the present invention to improve upon one of the previous methods for this purpose.

Particularly, when very thin stock, such as .004 inch in thickness, is being handled, there is required a more positive handling than previously provided in order that the cutting knives will (1) enter accurately between the sheets to be joined, and (2) the sheets will be held firmly and snugly together for both the cutting and welding operations.

In dealing with this problem it has been necessary to bear in mind that the leading strip is in one case the top one of the two superposed strips and in the next case it will be the bottom of the two superposed strips. Thus, whatever means are provided for holding the strips in proper position for reception of the cutting knives therebetween and for the welding and slitting operations, must be arranged to accommodate themselves to this alternating relationship. This has further complicated the handling of the strip material in question.

In said application Serial No. 227,446, there is described a method and apparatus by which the momentarily stationary ends of successive strips of weldable material, steel being referred to in said application for illustrative purposes, can be welded together and trimmed in only a few seconds. The method and means set forth in said application Serial No. 227,446 are highly effective for the purpose intended. However, in a continuing effort to improve upon the method and apparatus of said application, and particularly to provide improved apparatus, a number of further improvements have been made which it is the purpose of the present application to secure.

Accordingly, the objects of the present invention include:

(1) To provide a method for joining adjacent ends of strip segments and doing so at a high rate of speed and in a manner to provide good strength therebetween.

(2) To provide a method, as aforesaid, wherein it is unnecessary to trim the overlapped ends of the strips before joining, wherein excess material may be readily trimmed off after joining on either side of the joint to provide a smooth, well-trimmed and tight joint free of excess or unjoined material.

(3) To provide a method, as aforesaid, to remove the excess or unjoined material substantially during the joining or welding operation thereby securing a welded and trimmed joint without adding appreciable time for this function.

(4) To provide a method, as aforesaid, which is applicable to a wide range of materials, primarily weldable metals and which can be carried out by a wide range of apparatus.

(5) To provide improved method steps for the handling and controlling of strip material wherein a trailing end of one strip and a leading end of another strip are momentarily stopped, welded together and trimmed.

(6) To provide a method, as aforesaid, and particularly embodying the method and general type of apparatus set forth in application Serial No. 227,446, wherein control is maintained more exactly than previously over the strips of material being handled and the whole procedure is rendered more certain and reliable in operation.

(7) To provide a method and apparatus, as aforesaid, particularly wherein trimming knives are caused to enter between the base sheet of one strip and the free end of a second strip welded thereto for trimming said free end and wherein sufficient space is maintained between said strips at the moment of introducing the cutting means therebetween to insure accurate operation of the cutting means even under high-speed conditions.

(8) To provide a method and means, as aforesaid, in which said strips are maintained sufficiently spaced from each other at the time of entering therebetween by the cutting means to insure effective and accurate operation thereof.

(9) To provide a method and means, as aforesaid, wherein suitable lead-in means associated with the cutting knives are caused to enter between the above-mentioned strips of material prior to the welding together thereof and wherein after said welding is completed, the trimming of said strips proceeds as set forth in application Serial No. 227,446.

(10) To provide apparatus capable of carrying out the above-mentioned process and wherein it is substantially all open to direct visual supervision by the operator.

(11) To provide apparatus, as aforesaid, utilizing as much as possible of presently known apparatus for this purpose.

(12) To provide cutting means for appropriate association with apparatus, as aforesaid.

(13) To provide means, as aforesaid, which is sufficiently similar to previously known means that apparatus embodying the present invention can be inserted into a line processing steel strip material without requiring appreciable reorganization or even changing of other apparatus in said processing line.

Other objects and purposes of the invention will be apparent to persons acquainted with methods and apparatus of the present type upon reading the following disclosure and inspection of the accompanying drawings.

GENERAL DESCRIPTION

In general, the method aspects of the invention incorporate the steps of said previous application of first overlapping the respective trailing and leading ends of strips to be joined, joining same along a line substantially transverse to the longitudinal center lines of said strips and trimming the free ends extending beyond the joined-together zone of said strips. The present invention includes the additional step of maintaining said strips spaced from each other both prior and during the welding and trimming operations at a point close to but spaced from, and at least one side of, the zone of said welding. This provides a space between said strips on either side of the electrodes for the entry therebetween of the trimming knives.

Further, the present invention contemplates introducing suitable leading means for the trimming knives between said strips immediately prior to the joining of same together and then, as before, effecting the severing or trimming operation immediately following the joining-together operation.

The apparatus aspects of the invention include a separator positioned between the sheets of strip material as same approach the welding and trimming zone. Said separator is maintained between said sheets of strip material when same are clamped together whereby to maintain said strips spaced at a point close to but spaced from and on one side of said welding zone to effect easier entry of said leading means between said strips. In a modified form of the apparatus, such a separator is placed between said sheets of strip material on both sides of the welding electrodes.

DETAILED DESCRIPTION

In turning now to the details of the method and apparatus comprising the invention, it should be noted that the method can be most readily understood by a consideration of one specific apparatus for practicing same. Accordingly, attention will be directed toward certain specific apparatus embodying the apparatus aspects of the invention and capable of practicing said method, which description will be, insofar as the method is concerned, for illustrative purposes only and will carry no implication that the method can be practiced only by such apparatus.

In the following description, certain terminology will be used for convenience in reference and it will be understood that such terminolgy is only for convenience in reference and has no limiting significance. For example, the terms "forward" and "rearward" will denote directions with reference to the direction of movement of strip material through the apparatus, the forward side being that toward which such material moves and the rearward side being that away from which such material moves. "Upward" and "downward" will refer to directions related to the normal position of operation of the machine, the same being the positions shown in FIGURES 1, 2 and 3. The terms "inward" and "outward" will relate to directions toward and away from the geometric center of the apparatus. All of said terms will include derivatives of the words above specifically mentioned as well as words of similar import.

In general, one machine embodying the invention comprises a fixed frame 1 (FIGURES 1 and 2) supporting a carriage 2 for movement horizontally with respect to said frame structure 1 on any suitable means such as the rollers 161, 162 bearing on the rails 163. Drive means including the screw 3 effects horizontal movement of said carriage. Said carriage consists of a transformer section 4 and a pair of arms 6 and 7 extending from said transformer section 4 and carrying rolling electrodes 8 and 9 near their ends. This general type of apparatus is described more fully in said Serial No. 227,446 and reference is made thereto for further such details.

The electrodes 8 and 9 are carried on secondary arms 11 and 12 which are in turn carried pivotally at 13 and 14, respectively, on structures 16 and 17, which are mounted on said arms 6 and 7. Said electrodes are energized in a conventional manner through conductor bars 21 and 22 which are connected to the electrode-supporting means through flexible elements 23 and 24, respectively. Pressure fluid cylinders 26 and 27 are provided in a conventional manner for opening and closing said electrodes.

Said arms 6 and 7 extend beyond said electrodes and carry, respectively, at the extremities thereof the cutting assemblies 31 and 32. Each of the cutting assemblies 31 and 32 consists of a pair of cutting units which units may take any of many specific forms so that the following is set forth only briefly but sufficiently for a general understanding of this portion of the apparatus.

The cutting assembly 31, for example, includes a cutting unit 33 having a pressure fluid cylinder 34 mounted in any convenient manner on the end of the arm 6. It operates through a plunger 36 and a guide 37, said guide being mounted by bracket means 38 also on the end of the arm 6, to a cutter support 39. The cutter 41 is fixed on the lower end of said cutter support 39.

The cutting assembly 31 also has a cutting unit 42 which is generally similar to the cutting unit 33 and consists of a pressure fluid cylinder 43 operating a rod 44 which is guided through guide means 46 to support and actuate a cutter bracket 47 which in turn supports a cutter 48.

The two bottom cutting units 51 and 52, including cylinders 50 and 55, are generally similar to the upper cutting units 33 and 42, respectively, are similarly mounted and similarly actuate cutters 53 and 54, respectively.

Figure 1:
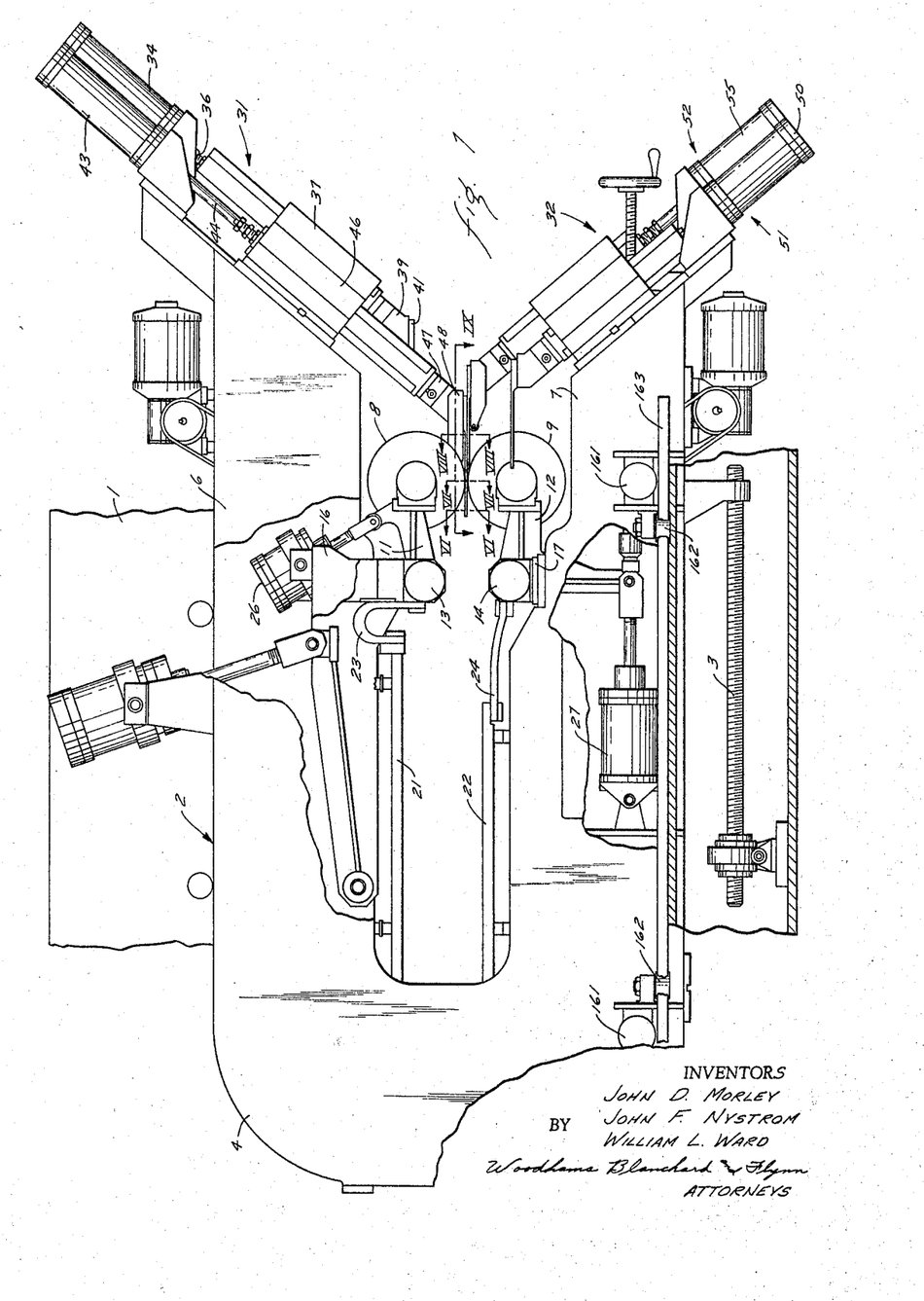
FIGURE 1 is a side elevational, schematic view of apparatus embodying the invention and looking at same in a direction parallel and opposite to the direction of travel of the strip material.
Figure 2:
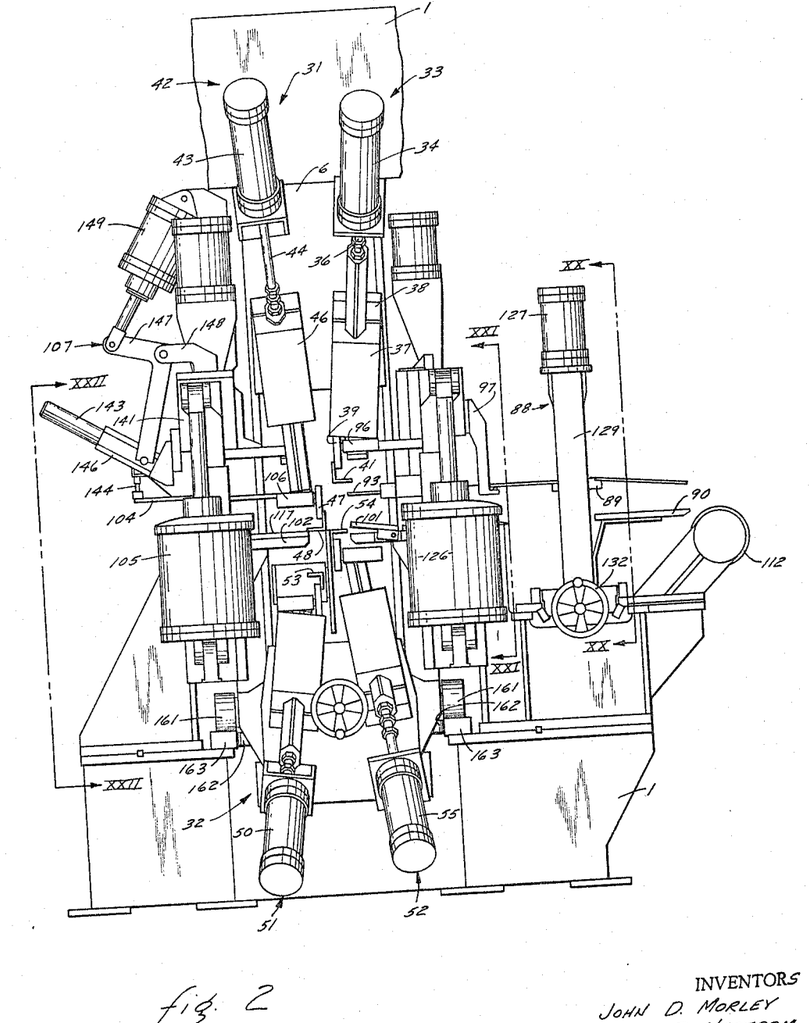
FIGURE 2 is an end elevational, schematic view of apparatus embodying the invention and looking at same in a direction transverse to the direction of travel of the strip material.

In the position shown in FIGURES 1 and 2, the cutting units 33 and 51 have had their respective cylinders energized in the retracting direction so that the cutters 41 and 53 are retracted out of cutting position. At the same time the cylinders 43 and 55 are energized in an extending direction so that their respectively connected cutters 48 and 54 are in operating position.

Which of said cutters are in operating position and which are retracted depends upon whether the upper or lower of the superposed strips is in the leading or trailing position, all as set forth in more detail in said application Serial No. 227,446 and hereinafter.

Figure 4:
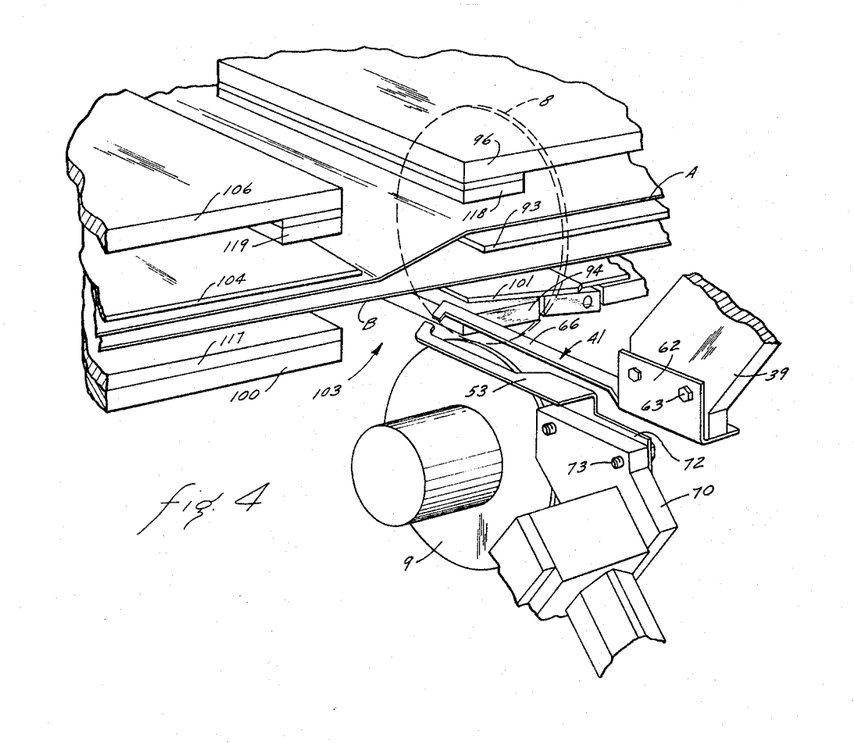
FIGURE 4 is an oblique view of the apparatus in the welding zone thereof with the clamping mechanism in open position.
Figure 5:
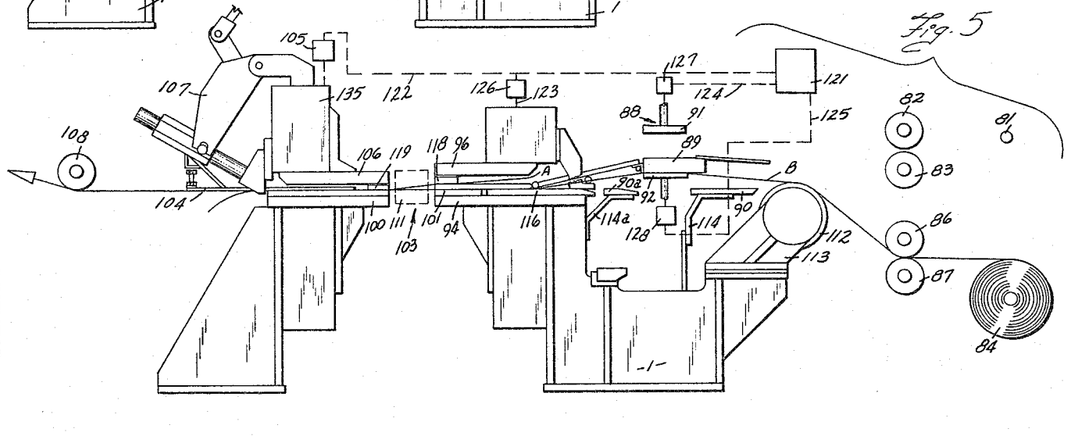
FIGURE 5 is a view similar to FIGURE 3 with the clamping mechanism in closed position.
Figures 5A, 6:
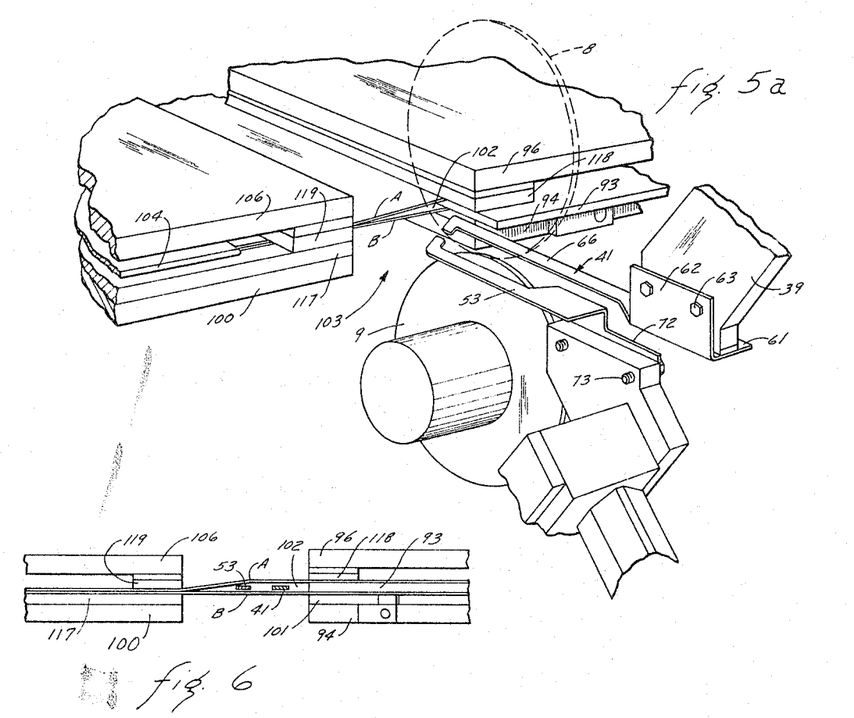
FIGURE 5a is a view similar to FIGURE 4 with the clamping mechanism in closed position.
FIGURE 6 is a section taken on the line VI—VI of FIGURE 1.

While the shape of the cutters may vary widely, there is shown in FIGURES 4 and 5a one form of knife or cutter design which, taken together with the illustration in FIGURE 6, will sufficiently show the details thereof.

Figure 9:
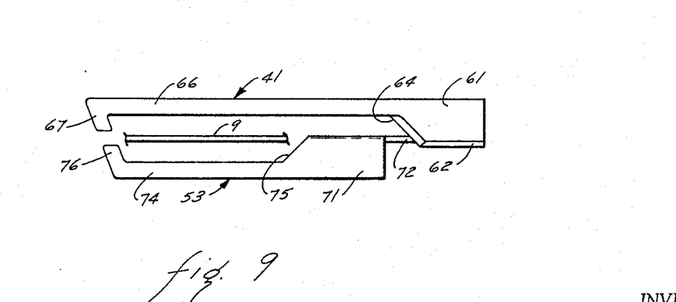
FIGURE 9 is a top plan view of the knife elements preferably used with the apparatus of the present invention.

Referring first to the cutter 41 there is a base portion 61 having a mounting flange 62 by which said knife or cutter 41 is mounted to the cutter support 39 (FIGURE 4) in any convenient manner, such as by screws of which one is shown at 63. Said cutter 41 has a slanted cutting edge 64 (FIGURE 9) at the inward edge of the base portion 61 and an arm 66 extending from said base portion 61 sufficient to enable it to extend beyond the welding electrode 9. The inner end of said arm 66 has a sidewardly turned tip or guard 67 for purposes appearing hereinafter.

Similarly, the cutter 53 has a base portion 71 having a mounting flange 72 which is fastened to a mounting bracket 70 by any convenient means, such as screws, of which one is shown at 73. The inner edge of the cutter 53 has a cutting edge 75 and said base portion 71 also has an inwardly extending arm 74 carrying a sidewardly directed guard 76 at its leading edge. The guards 67 and 76 are substantially aligned with each other and both of them are inwardly of the welding electrode 9.

Figure 3:
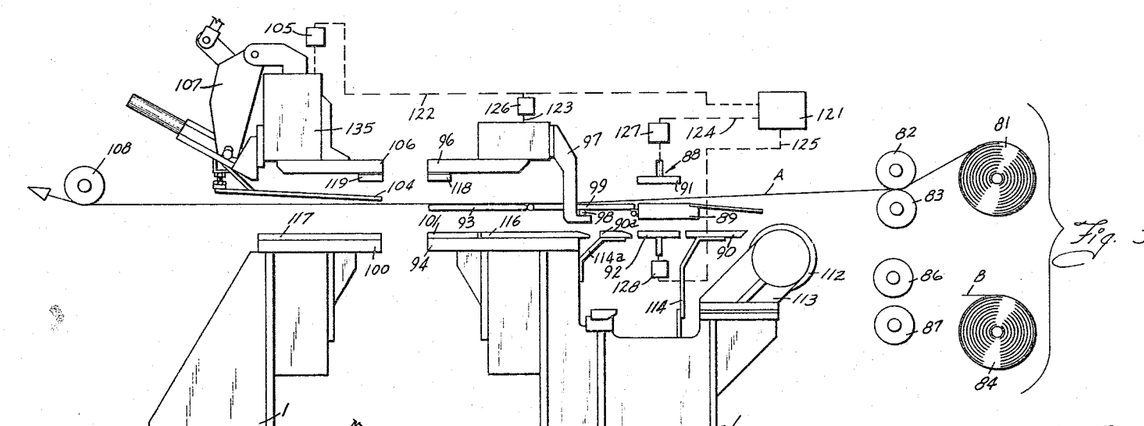
FIGURE 3 is a schematic, side view of the entire apparatus with the clamping mechanism in open position.

Turning now to FIGURE 3, there is shown somewhat schematically an arrangement of the apparatus as same would appear on a section taken substantialy through the central longitudinal axis of the strip material being joined. It will be understood, however, that said FIGURE 3 is largely schematic, intended to show the organization and relative parts of the apparatus and not intended to be a true section showing details.

An upper supply roll 81 supplies a web A of strip material to a pair of upper punch rolls 82 and 83 in a conventional manner. Correspondingly, a lower supply roll 84 supplies the lower web B to a pair of lower pinch rolls 86 and 87. Said rolls 81 and 84 are replaceable as one or the other becomes exhausted. The upper web A passes from the upper pinch rolls 82 and 83 into the upper part of a table clamp 88. Said table clamp 88 consists of a fixed midportion 89 and movable clamp portions 91 and 92. A spacer 93 is supported above a table 94 by means more fully shown hereinafter, said table 94 being mounted in any convenient manner upon the frame of the machine. A feed-side clamp 96 is mounted for vertical movement as desired and is connected through an arm 97 to means for effecting movement of the spacer 93 toward and away from the table 94. In this instance, downward movement of the arm 97 permits the panel 99 to move downwardly and with it the spacer 93 moves downwardly. Thus, in its downwardmost position, the web on strip B extends between the spacer 93 and the top panel 101 on the table 94 while the web or strip A extends between the clamp 96 and the spacer 93. Thus, both the strips A and B are firmly clamped in position with the space 102 (FIGURE 5a) being provided adjacent the feed-side clamp 96.

A table 100 substantially similar to the table 94 is provided on the discharge side of a working zone 103 (FIGURES 5, 5a) said table being fastenend to the frame of the machine in the same general manner as the table 94 A deflector 104 is provided above the table 100 but retractably supported as hereinafter further described. A clamp member 106 is positioned and spaced above the deflector 104 and is arranged for upward and downward movement in any convenient manner such as by the cylinder 105 (FIGURES 3, 2) Downward movement of the clamp 106 is accompanied by leftward (as appearing in FIGURE 4) movement of the deflector 104 to the position shown in FIGURE 5 so that in this instance the clamp 106 will bear against the table 100 for holding the strips A and B firmly together on their trailing side. Contrastingly, in the open position both the deflector 104 and the clamp 106 are spaced from the table 100 and both the strips A and B are free to move vertically as needed. Suitable mechanical means 107 are provided for moving the deflector 104 from its FIGURE 4 position to its FIGURE 5 position as required.

The strip material exiting from the machine is then conducted to suitable use or control means, such as conventional looping means of which one initial roller is shown at 108. The welding and cutting means elsewhere herein described is aligned for movement perpendicular to the plane of the paper in the region indicated by the broken line box 111 (FIGURE 5).

Other guide and supporting means may be provided as convenient. In this particular embodiment, such guide means includes a roller 112 supported in any convenient manner by an arm 113 upon the base frame structure 1 and tables 90 and 90a suported by brackets 114 and 114a on the frame structure 1. A guide surface 116 is supported upon the table 94 and abuts, usually pivotally, with the guide panel 101. Similarly, the table 100 may have a surface panel 117 affixed thereto. The clamps 96 and 106 carry clamp pads 118 and 119 thereon, which clamp pads are often, at least in part, magnetized for assisting in raising the upper sheet material and holding same after a portion thereof has been severed from the remaining strip.

Figure 20:
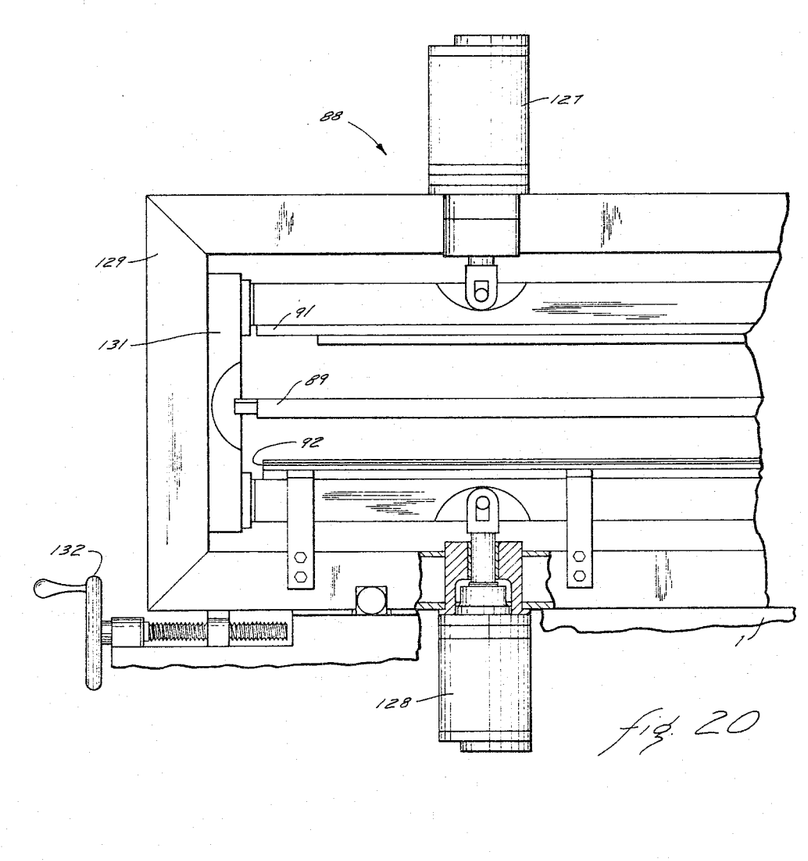
FIGURE 20 is a fragmentary section showing a clamp assembly taken substantially on the line XX—XX of FIGURE 2.
Figure 21:
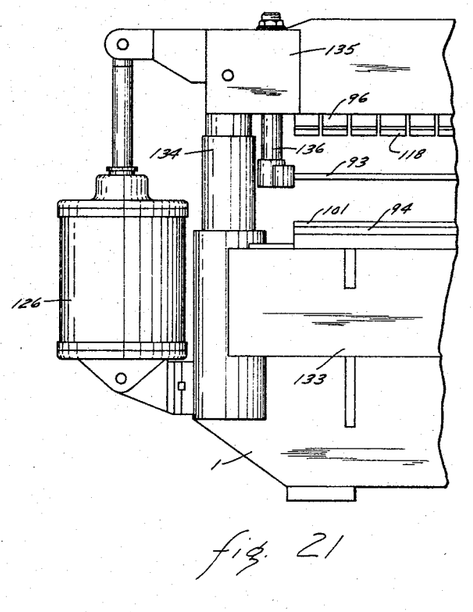
FIGURE 21 is a fragmentary view showing another clamp assembly taken substantially on the line XXI—XXI of FIGURE 2.
Figure 22:
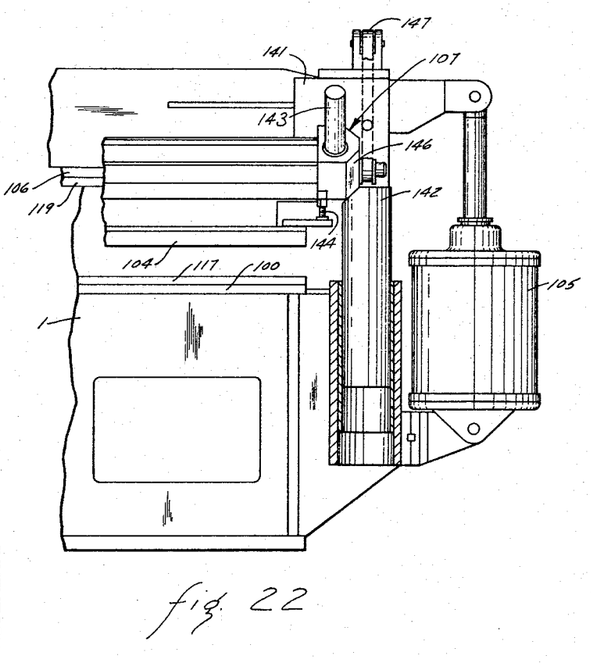
FIGURE 22 is a fragmentary view of a further clamp assembly taken substantially on the line XXII—XXII of FIGURE 2.

The several clamp means above referred to are of conventional sort and may take any of many forms. However, the specific clamps used in connection with the embodiment illustrated herein are shown in FIGURES 20, 21 and 22 sufficiently to indicate further certain acceptable constructions. In FIGURE 20 the clamp mechanism 88 is shown as comprising a frame 129 mounted rigidly to the frame 1 of the machine. Cylinders 127 and 128 are positioned for moving the movable clamp members 91 and 92 as desired, respectively, downwardly and upwardly against the fixed midportion 89, said fixed midportion being mounted rigidly to the frame 129. The movable clamp members 91 and 92 are slidably mounted and guided in any convenient manner in the slide means 131. Threaded means controlled by the wheel 132 are provided for adjusting the clamp structure 88 laterally of the rest of the apparatus for alignment purposes prior to welding.

The clamp structure including the clamp 96 is of any convenient structure and that shown in FIGURE 21 will illustrate one acceptable embodiment. Here the clamp base 133 supports the table 94 with its cover panel 101 on, and rigidly with respect to, the frame 1 of the machine. The clamp 96 is mounted on the clamp-supporting structure 135 which in turn is mounted on the slide structure 134 for vertical movement with respect to the table 94. Said clamp-supporting structure 135 is vertically actuated by suitable pressure fluid cylinders of which one appears at 126. The spacer 93 is hung below the clamp 96 on a slide rod 136 which itself slidably hangs from the clamp-supporting structure 135. Thus, as the cylinder 126 moves the clamp-supporting structure 135 downwardly, the spacer 93 will first move downwardly against the table 94 (or the cover panel 101 thereon if one is used) after which the clamp-supporting structure 135 will slide on the slider 136 as the clamp 96 continues to move downwardly until the clamp 96 bears against the spacer 93 with a clamping pressure.

The clamp 106 is mounted on a structure generally similar to the clamp 96 and same is illustrated in FIGURE 22. Said clamp 106 is mounted on clamp-supporting structure 141 which in turn is mounted on the slide structure 142, said slide structure being generally similar to the slide structure 134. A pair of pressure fluid cylinders of which one is shown at 105 is positioned for moving said clamp supporting structure 141 vertically as desired. The table 100 is mounted fixedly on the frame structure 1 of the machine.

The means 107 mounting the deflector 104 is in this embodiment for convenience also mounted on the clamp-supporting structure 141 whereby said deflector will move toward and away from the table 100 simultaneously with the clamp 106 while being movable in and out of a position under said clamp 106 on the rod 143. The deflector 104 is mounted (FIGURES 2 and 22) through vertically adjustable means 144 on and with limited pivotal movement with respect to a slide 146 which is itself slidably mounted on the rod 143, said latter being in turn fixedly mounted into the clamp-supporting structure 141. A bell crank 147 mounted through an arm 148 onto the clamp-supporting structure 141 actuates said slide in response to energizing of a cylinder 149. Thus, the deflector 104 can move into and out of operating position in response to actuation of the cylinder 149.

Suitably synchronized power means are provided for actuating the above-described clamps in a desired sequence. However, these items are well known to the industry and form no part of the present invention and, accordingly, detailed description thereof is omitted. Such control is, however, indicated schematically at 121 (FIGURE 5) the same being connected by lines 122, 123, 124 and 125 to the clamp means 106, 96, 91 and 92, respectively.

OPERATION

The sequence of operation is best understood by reference to FIGURES 10 through 19.

Figure 10:
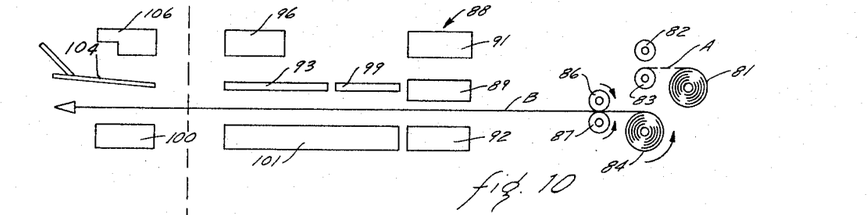
FIGURES 10 through 14, inclusive, schematically represent successive steps in effecting the welding together of successive strip ends and trimming the loose material therefrom, said figures illustrating the method and operation of the apparatus of the invention wherein the bottom of a pair of substantially superposed strips constitute the leading strip and the upper of said pair constitutes the following strip.
Figure 11:
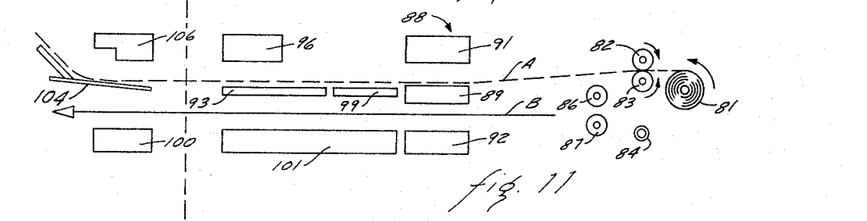
Figure 12:
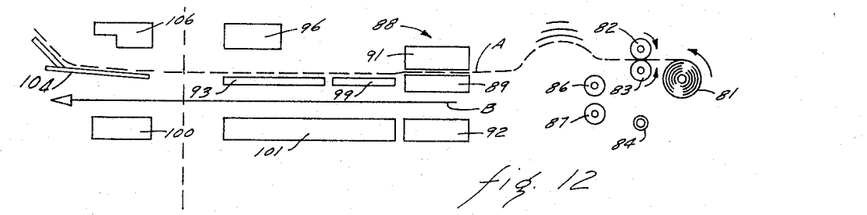

Referring first to FIGURES 10 through 14, the sequence of operations is shown where the lower strip B is the traveling strip and the upper strip A is the new strip. FIGURE 10 shows strip B going through the joining and trimming machine but approaching its end on the roll. Strip A is being fed between the pinch rolls 82 and 83 which feed same (FIGURE 11) between the upper pair of clamps in the clamp unit 88, above the panel 99 and spacer 93 and thence to a point above the deflector 104, the latter being moved into its lower position to intercept said strip A and insure its deflection upwardly. The upper pair of clamps of the clamp unit 88 now close (FIGURE 12). Pinch rolls 82 and 83 are then again operated to provide a hump which will allow the entire clamp assembly 88, hence the new end A, to be moved transversely to the direction of strip travel by means of hand crank 132 (FIGURE 2) and lead screw for visual alignment of the front edges of the new end A and the still traveling strip B. At this point, the equipment is ready to make the joint and no excessive down time has been required for this preparation. The clamps 96 and 106 move downwardly (FIGURE 13) upon proper control initiation. This moves the spacer 93 also downwardly against the table panel 101. The upper and lower strips A and B are now firmly gripped between the clamps and the parts are in the position shown in FIGURE 13.

The welding and severing carriage is now caused to move transversely to the strips A and B, such as by actuation of a suitable drive means partially indicated by the screw 3 shown in FIGURE 1. This first introduces the guards of the cutters 48 and 54 (FIGURE 2) into the triangular space 102 (FIGURE 5a) defined by the strips A and B. The guard on the cutter closer to the rolls 81 and 84 is preferably longer than the guard on the other cutter, the former guard entering the wider part of the triangular space 102 and deleting such space, if necessary, sufficiently to allow easy entry of the latter guard. When said guards have safely entered between said strips, the welding electrodes 8 and 9 then follow immediately thereafter and effect a welding connection between said strips. The knife edges of said cutters 48 and 54 then follow immediately after said welding rolls and in the manner set forth in detail in the copending application Serial No. 227,446, the free ends of said strips A and B are severed along a line parallel and adjacent, usually close to, the weld zone and the joining is completed.

All clamps now open (FIGURE 14,) the deflector 104 retracts and the strip continues from the upper roll 81.

The upper clamp member 106 may, when the strips A and B are of magnetic material be magnetized or include vacuum means for holding the cut off end of the strip contacted thereby in a position for easy removal from the machine after the clamps are opened.

Figure 7:
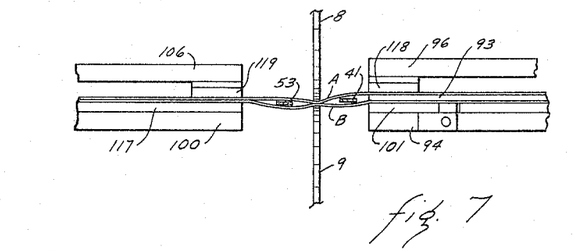
FIGURE 7 is a section taken on the line VII—VII of FIGURE 1.
Figure 8:
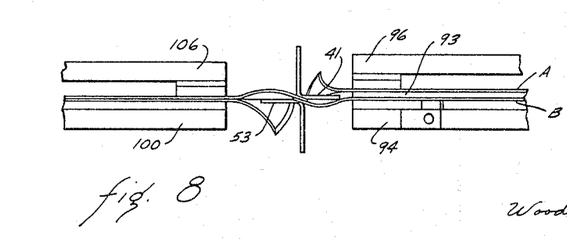
FIGURE 8 is a section taken on the line VIII—VIII of FIGURE 1.

The opposite sequence appears in FIGURES 15 through 19, showing the upper strip A approaching its trailing end and about to be welded to the leading end of the new lower strip B, the previous roll 84 having during the running of the upper strip A been replaced by a fresh lower roll 84. The sequence from FIGURES 15 through 19 will be self-explanatory in view of the description of FIGURES 10–14 and will not need to be further described excepting to note that in this instance the cutter controlling cylinders 34, 43, 51 and 52 will be energized to retract the cutters 48 and 54 and project the cutters 41 and 53 into operating position as shown in FIGURES 4 and 5a. The cutting operation appears in FIGURES 6–8 wherein FIGURE 6 shows the knife guards of the cutters 41 and 53 entering between the strips A and B, in FIGURE 7 there is shown the welding electrodes 8 and 9 welding together the strips A and B and in FIGURE 8 the cutters 41 and 53 are shown severing the free ends of said strips from the base portions thereof.

However, whichever set of cutters is being used, the spacer 93 continues in most cases to provide sufficient space existing between the strips A and B to assure entry of the arms of the appropriate cutters between said strips and thus insure proper action of the knife edges of whichever pair of cutters is being used in a given instance.

Figure 23:
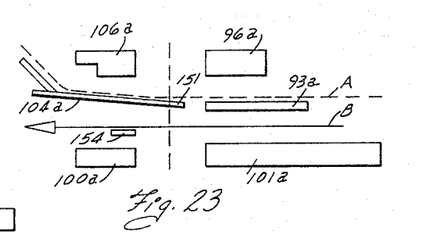
FIGURE 23 is a schematic view corresponding insofar as the sequence of operations is concerned with FIGURE 11 but illustrating a modification.
Figures 24, 25, 26:
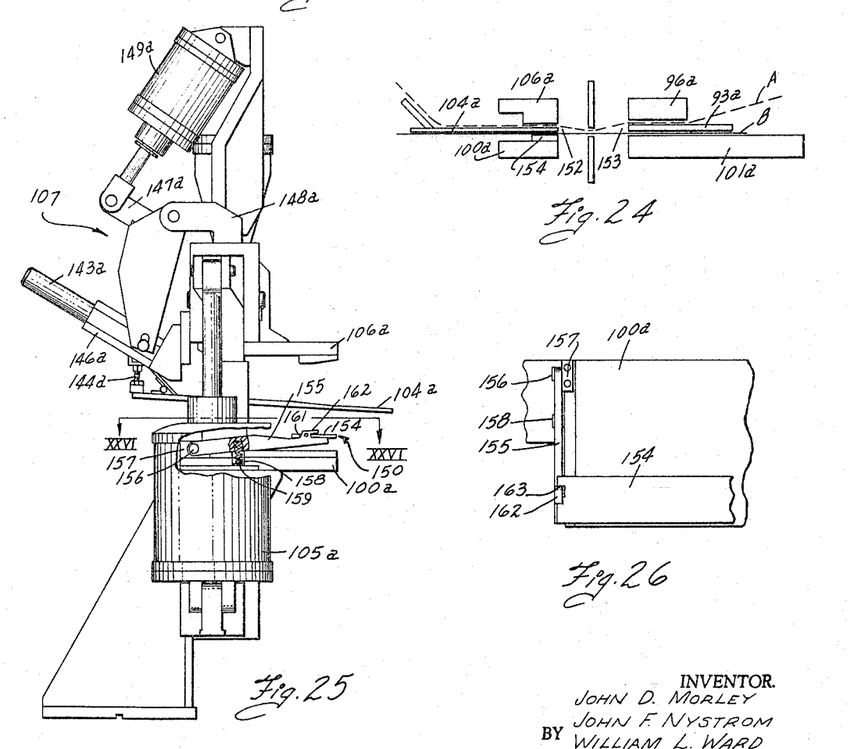
FIGURE 24 is a schematic view corresponding insofar as the sequence of operations is concerned with FIGURE 13 and showing the modification of FIGURE 23 in a different operating position.
FIGURE 25 is a side elevation view of the modified portion of the apparatus.
FIGURE 26 is a fragmentary top view of the separator shown in FIGURE 25.

Modification of FIGURES 23–25

Turning now to the modifications set forth in FIGURES 23–25, means are therein illustrated embodying the same principles as those of the foregoing-described apparatus but adapted for handling certain more difficult situations where the foregoing-described apparatus may not in all cases be fully effective.

Looking first at FIGURE 23, which is a schematic view corresponding insofar as the sequence of operations is concerned with FIGURE 11 above described, it will be noted that most of the structure is the same and such structure is identified by corresponding numerals with a subscript "a." The only part which is different is the deflector 104a which is identical in both structure and operation to the deflector 104 of FIGURE 11 excepting that the point 151 thereof is somewhat longer than the corresponding part of the deflector 104. Thus, as shown in FIGURE 23, when the clamps are opened, said clamp 151 will approach very close to the separator 93a to insure the travel of even very light gauge stock comprising the strip A off from the separator 93a and onto the deflector 104a.

Figure 13:
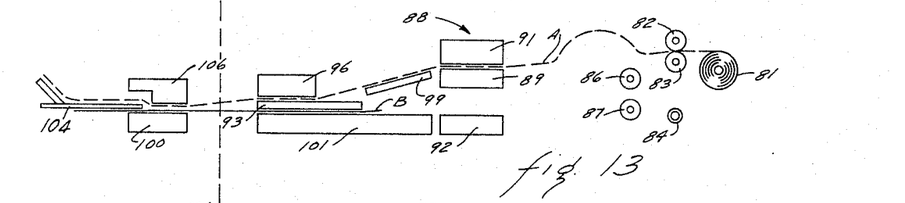
Figure 14:
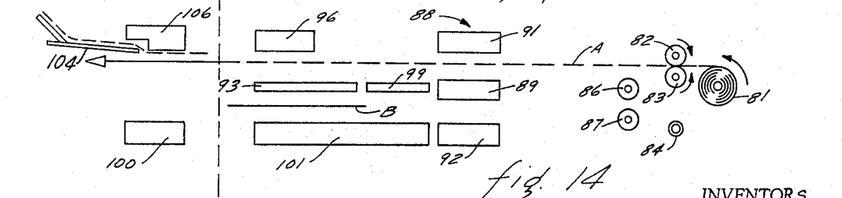
Figure 15:
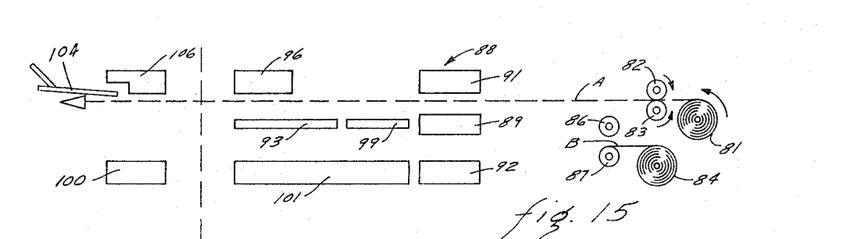
FIGURES 15 through 19, inclusive, schematically represent successive steps in effecting the welding together of successive strip ends and trimming the loose material therefrom, said figures illustrating the method and operation of the apparatus of the invention wherein the top of a pair of substantially superposed strips constitutes the leading strip and the bottom of said pair constitutes the trailing strip.
Figure 16:
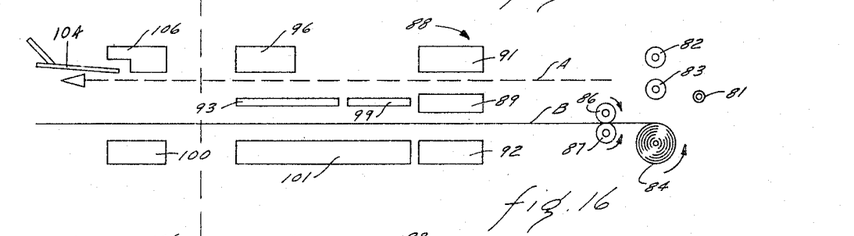
Figure 17:
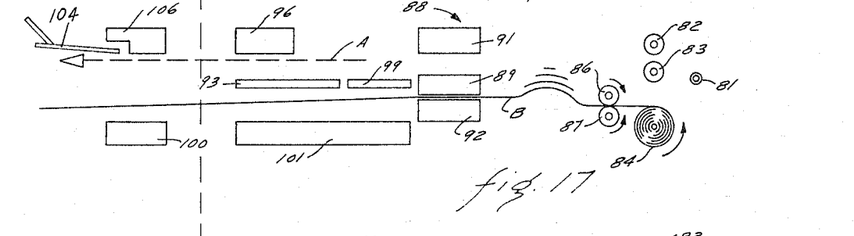
Figures 18, 19:
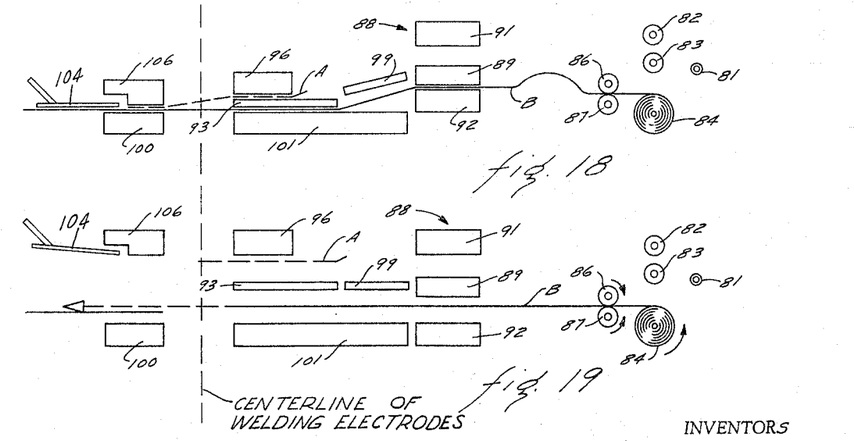

When the clamps close, the deflector 104a retracts in the same manner as above described for the deflector 104 but due to its greater length its outermost tip retracts only to the position shown in FIGURE 24 wherein its rightward edge is substantially flush with the corresponding edges of the clamps 106a and 100a instead of being retracted substantially behind said edge as in the case of the position shown in FIGURE 13. Thus, there is provided a spacer between both the strip A and the strip B so that with the parts pinched together by the welding electrodes as indicated in FIGURE 24, there is still a pair of triangular spaces 152 and 153 provided on either side of the welding electrodes.

In addition, a separator 150 is provided above the lower table 100a to provide the desired separation of the strips on the downstream side of the welding electrodes when the trailing edge to be joined is on the uppermost of the two superimposed strips.

The separator 150 consists of a plate 154 loosely supported by any convenient means, such as the pair of arms located respectively at each end thereof and of which one is shown at 155. Said arms are mirror images of each other and the description and illustration of one thereof will suffice to illustrate both. Said arm 155 is mounted pivotally at 156 on an upstanding lug 157, said lug being rigidly affixed to said plate 100a. Resilient means, such as a coil spring 159, holds the arm 155 in a normally raised position. Guide means, such as a U-shaped member 158, are preferably provided to restrict sideward movement of the arm 155. The free end of arm 155 has an upstanding post 161 topped by a cap 162. The edge of said arm adjacent the free end thereof is tapered at such an angle that it will be parallel with the upper surface of the plate, as shown in FIGURE 25, when sad arm is in its normal raised position. The separator plate 154 has a notch 163 in its end for reception thereinto of the post 161. The parts are loosely positioned as shown so that when the arm is in its raised position the plate will occupy a position parallel with the upper surface of the table 100a, as aforesaid, and when it is in its lower position said plate can lie flat against the lower strips to be joined which in turn lies flat against said upper surface.

Figure 27:
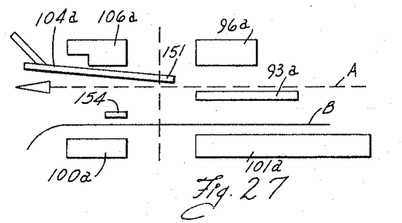
FIGURE 27 is a diagrammatic view similar to FIGURE 23 but showing the arrangement of the parts when the trailing end of the parts to be joined is on the upper of the two superimposed strips and showing the clamping members in their open position.
Figure 28:
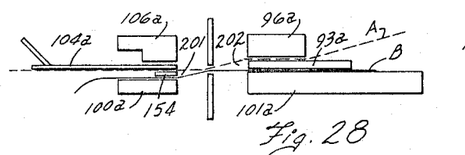
FIGURE 28 is a diagrammatic view corresponding to the condition of FIGURE 27 and showing the clamping parts in their closed position.

When the trailing end to be joined is on the uppermost of the two superimposed strips, said strip will extend below the deflector 104a, as shown in FIGURE 27. Since the new strip to be joined is below the strip having the trailing end, the deflector 104 is now useless. Therefore, the separator 150 is provided and the leading end of said lower strip B is led between said separator 150 and the table 100a. Thus, when the discharge side clamp 106a closes, as shown in FIGURE 28, said separator is between the upper and lower strips to provide a space 201 on the discharge side of the welding electrodes in a manner corresponding to that above described for the space 152 provided by the separator 104a and as shown in FIGURE 24.

This will have several advantages applicable in certain particular instances. For example, it is necessary to draw the strip very tight in order to be sure of a proper opening on both sides of the welding electrodes in the form shown in FIGURES 1 to 22. Where there is serious camber in the strips, this tightness may vary and occasionally the knives may not properly enter into the strip on the side of the welding electrodes where the opening is relatively narrow. In the structure shown by this modification, the opening is held positively and no difficulty will be experienced even with quite excessively cambered strip stock. A further advantage of the form of this modification arises where the strip is relatively heavy so that a knife entering into the relatively small opening provided on one side in the form of FIGURES 1 to 22, may cause the strip to crack rather than be properly sheared. The structure of this modification in providing ample room for entry of the knives, insures that the strip will not bend over the knife but will be held firmly by the clamps to receive the shearing action.

Other advantages have been noted but the foregoing will suffice for illustrative purposes.

While specific apparatus is shown herein embodying a preferred form of the apparatus aspects of the invention, and said apparatus also illustrates a preferred manner of carrying out the method aspects of the invention, it will be recognized that other kinds of apparatus will be available to carry out said method and the apparatus aspects of the invention may also be embodied in other specific apparatus and, accordingly, the hereinafter appended claims will be understood as including such variations in both method steps and apparatus excepting as said claims by their own terms specifically provide otherwise.

What is claimed is:

1. In a method for joining adjacent ends of successive strips of weldable material, the steps comprising:
    overlapping said adjacent ends;
    clamping said overlapped material at a point spaced from, and on one side of, the zone at which said material is to be joined;
    holding the two strips of said overlapped material in fixed relationship to each other but spaced from each other at a point spaced from, and on the other side of, said zone;
    bringing said strips together at said zone and effecting an adherence therebetween and introducing spacers between said strips on either side of said zone between said zone and said points of clamping and holding, respectively, in close relation to effecting said adhering;
    trimming the portions of said ends extending beyond said zone immediately following the effecting of said adhering between said strips and releasing both strips of said material.

2. In a machine for welding together overlapped, adjacent ends of strips, said machine having rolling welding electrodes adapted for travelling transversely of said strips and cutters following said electrodes for trimming the unwanted portions of said overlapped strips, means for facilitating the holding of said strips appropriately for action thereon by said electrodes and said cutters, comprising in combination:

a first pair of clamps for engaging said strips before they reach the zone travelled by said welding electrodes and a second pair of clamps for engaging said strips after they leave said zone;

a plate interposed between said first pair of clamps and means movable with said clamps for spacing said plate away from said clamps when said clamps are open and for permitting said plate to move toward one of said clamps when said clamps close;

means supporting one strip for passing between said plate and the upper one of said first pair of clamps and thence between said second pair of clamps; and other means for supporting the second strip for passing between said plate and the lower one of said first pair of clamps and thence between said second pair of clamps.

3. In a machine for welding together overlapped, adjacent ends of longitudinally oppositely extended strips, said machine having rolling welding electrodes adapted for travelling a path extending transversely of said strips and cutters following said electrodes for trimming the unwanted portions of said overlapped strips, means for facilitating the holding of said strips appropriately for action thereon by said electrodes and said cutters, comprising in combination:

clamp means for holding said strips in spaced relationship to each other adjacent the welding electrode path, such clamp means being spaced longitudinally of said strips along the overlapped portions thereof and disposed at locations on both sides of said transverse path;

leader means for entering the spaces between said strips established by said clamp means and thereby holding said strips spaced after welding to permit trimming thereof by said cutters, said leader means being aligned with the space between said overlapped portion of said strips, such leader means being provided on each of said cutters substantially in the cutting plane of each of said cutters and extending ahead of said cutters when cutting and alongside the electrodes.

4. The device defined in claim 2 including leaders on said cutters extending ahead thereof and alongside said electrodes and a carriage for carrying said electrodes, said leaders and said cutters and for moving same transversely simultaneously; and means relating the transverse movement of said carriage with the opening and closing of said clamps in such a fashion that said leaders will enter between said strip material and said welding electrodes will contact said strip material after the closing of said clamps, said clamps subsequently opening when said cutters have passed beyond said strips and the trimming thereof is completed.

5. The device defined in claim 2 including a deflector plate positioned adjacent the discharge side of said second pair of clamps and means for alternately (1) positioning said deflector plate with one edge substantially adjacent the surface of the lower one of said second pair of clamps and the other edge above and rearwardly therefrom and (2) upwardly out from said position;

whereby when the upper strip is the trailing one of the two strips being fastened, the leading edge thereof may be propelled rapidly into position overlying said bottom strip and same will be deflected by said deflector plate upwardly into a position both (1) to prevent contact with and scratching of said lower strip by said upper strip prior to clamping thereof and (2) in position to be readily grasped and removed from the apparatus after the trimming operation is completed.

6. The device defined in claim 2 including means on the upper of said second pair of clamps effective for holding an upper cut off end in temporary fixed position after the trimming operation is completed for subsequent grasping thereof and removal of same from the machine.

7. The device defined in claim 2 wherein a pair of cutters is provided for acting on selected strip portions on respectively opposite sides of said weld zone wherein a leader is provided on each cutter and extends therefrom generally in the direction of said electrodes, and wherein the leader on the cutter closest to said first pair of clamps is longer than the other leader.

8. In a machine for welding together overlapped, adjacent ends of strips, said machine having rolling welding electrodes adapted for travelling transversely of said strips and two pairs of cutters following said electrodes for trimming the unwanted portions of said overlapped strips, means for facilitating the holding of said strips appropriately for action thereon by said electrodes and said cutters, comprising in combination:

a first pair of clamps for engaging said strips before they reach the zone travelled by said welding electrodes and a second pair of clamps for engaging said strips after they leave said zone;

a plate interposed between said first pair of clamps and means movable with said clamps for spacing said plate away from said clamps when said clamps are open and for permitting said plate to move toward one of said clamps when said clamps close;

means supporting one strip for passing between said plate and the upper one of said first pair of clamps and thence between said second pair of clamps;

other means for supporting a second strip for passing between said plate and the lower one of said first pair of clamps and thence between said second pair of clamps;

leader means substantially in the cutting plane of each of said cutters and extending in the direction of travel of said cutters when cutting to positions alongside said electrodes, whereby said leader means will enter between said strips and thereby hold said strips spaced sufficiently to permit action thereon by said cutters;

said two pairs of cutters being associated for transverse movement in fixed relationship to said welding electrodes, two of said cutters being positioned for cutting the lowermost strip on either side of said weld zone and two of said cutters being positioned for cutting the uppermost strip on either side of said weld zone;

slide supported means for independently holding selected ones of said cutters in operating position and for retracting same out therefrom; and means energizing opposite ones of said slide supported means for placing nonsimilar upper and lower cutters in operating position at one time.

9. The device defined in claim 8 wherein the slide supported means constitutes at least two pairs of reciprocable elements substantially parallel with each other, one pair thereof being below the said electrodes and the other pair being substantially above said electrodes, whereby selected pairs of cutters can be moved into operating position at a given time as desired.

10. In a method for joining adjacent ends of successive strips of weldable material, the steps comprising:

overlapping said adjacent ends;

clamping said overlapped material at points spaced from each other and on opposite sides of the zone at which said material is to be joined, the strips of said overlapped material being spaced from each other at least between one of said points and said zone;

introducing spacers between said strips at least between said zone and said points in close relationship with the contacting thereof by the welding means and effecting an adherence therebetween;

trimming the portions of said ends extending beyond said zone material immediately following the effecting of said adhering between said strips and releasing both strips of said material.

11. In a machine for welding together overlapped adjacent ends of weldable strips, said machine having rolling, welding means adapted for traveling transversely of said strips and cutters following said electrodes for trimming the unwanted portions of said overlapped strips, means for facilitating the holding of said strips appropriately for action thereon by said electrodes and said cutters comprising the combination:
 a first pair of clamps for engaging said strips before they reach the zone traveled by said welding means and a second pair of clamps for engaging said strips after they leave said zone;
 a plate interposed between said first pair of clamps and means movable with said clamps for placing said plate away from said clamps when said clamps are open and for permitting said plate to move toward one of said clamps when said clamps close;
 a deflector element positioned between said second pair of clamps;
 means for alternately advancing said deflector element between said second pair of clamps toward said first pair of clamps and retracting said deflector element away from said first pair of clamps;
 means supporting one strip for passing between said plate and the upper one of said first pair of clamps and thence between said second pair of clamps and other means for supporting a second strip for passing between said plate and the lower one of said first pair of clamps and thence between said second pair of clamps;
 said one strip passing above said deflector element when same is advanced toward said first pair of clamps and passing below said deflector element when same is retracted away from said first pair of clamps.

12. The device defined in claim 11 wherein said deflector element when in retracted position is no longer between said second pair of clamps and said two strips are held in contact with each other by said second pair of clamps.

13. The device defined in claim 11 wherein said deflector element when in retracted position is still between said second pair of clamps and acts as a spacer to hold said two strips spaced apart from each other in the zone adjacent said second pair of clamps.

14. In a machine for welding together overlapped adjacent ends of two weldable strips, said machine having roller welder electrodes mounted for traveling transversely of said strips and cutters following said electrodes for trimming the unwanted portions of said overlapped strips, means for facilitating the holding of said strips for action thereon by said electrodes and said cutters, comprising in combination:
 a first pair of clamps for engaging said strips before they reach the zone traveled by said welding electrodes and a second pair of clamps for engaging said strips after they leave said zone;
 a first spacer interposed between said first pair of clamps and means for placing said first spacer away from said first pair of clamps when same are open and for permitting said first spacer to move toward one of said first pair of clamps when same are moved together;
 a deflector positioned between said second pair of clamps;
 a second spacer positioned between said second pair of clamps below said deflector and means for placing said second spacer away from said second pair of clamps when same are open and for permitting said second spacer to move toward one of said second pair of clamps when same are moved together;
 means supporting one strip for passing between said first spacer and the upper one of said first pair of clamps and thence between the upper one of said second pair of clamps and said second spacer; and
 means supporting the other strip for passing between said first spacer and the lower one of said first pair of clamps and thence between said deflector and the lower one of said second pair of clamps, whereby said one strip is always above said other strip, said first spacer is between said strips on one side of said zone and one of said deflector and said second spacer is between said strips on the other side of said zone.

15. A machine according to claim 14, including means for alternately advancing said deflector between said second pair of clamps toward said first pair of clamps and retracting said deflector away from said first pair of clamps.

16. In a machine for welding together overlapped adjacent ends of two weldable strips, said machine having roller welder electrodes mounted for traveling transversely of said strips and cutters following said electrodes for trimming the unwanted portions of said overlapped strips, means for facilitating the holding of said strips for action thereon by said electrodes and said cutters, comprising in combination:
 a first pair of clamps for engaging said strips before they reach the zone traveled by said welding electrodes and a second pair of clamps for engaging said strips after they leave said zone;
 a first spacer interposed between said first pair of clamps and means for placing said first spacer away from said first pair of clamps when same are open and for permitting said first spacer to move toward one of said first pair of clamps when same are moved together;
 a second spacer positioned between said second pair of clamps and means for placing said second spacer away from said second pair of clamps when same are open and for permitting said second spacer to move toward one of said second pair of clamps when same are moved together;
 means supporting one strip for passing between said first spacer and the upper one of said first pair of clamps and thence between the upper one of said second pair of clamps and said second spacer; and
 means supporting the other strip for passing between said first spacer and the lower one of said first pair of clamps and thence between said second spacer and the lower one of said second pair of clamps, whereby said one strip is always above said other strip, said first spacer is between said strips on one side of said zone and said second spacer is between said strips on the other side of said zone.

References Cited by the Examiner

UNITED STATES PATENTS

| | | | |
|---|---|---|---|
| 2,143,969 | 1/1939 | Biggert | 219—104 X |
| 2,369,830 | 2/1945 | Johnson et al. | 219—78 X |
| 2,478,491 | 8/1949 | Lang | 219—78 |
| 2,892,921 | 6/1959 | Mecklenborg | 219—83 X |
| 3,102,189 | 8/1963 | Jones et al. | 219—82 |

RICHARD M. WOOD, *Primary Examiner.*

B. A. STEIN, *Assistant Examiner.*